INVENTOR
BRIAN RICHARD TUGWOOD
BY Toulmin & Toulmin
ATTORNEYS

3,079,531
Patented Feb. 26, 1963

3,079,531
AIRCRAFT PROPELLER ENGINE SPEED
CONTROLS
Brian Richard Tugwood, Hatfield, England, assignor to
The De Havilland Aircraft Company, Hatfield, England,
a company of Great Britain
Filed Aug. 13, 1958, Ser. No. 754,856
Claims priority, application Great Britain Jan. 30, 1958
6 Claims. (Cl. 317—5)

This invention relates to aircraft propeller engine speed controls and is more particularly concerned with synchronising the engines of a multi-engine aircraft with a master speed signal. Such a master speed signal may be derived from one engine and the remaining engines would then be controlled in accordance with this signal. The actual method of engine speed control usually employed comprises a governor unit with an adjustable speed datum which operates to maintain any desired speed by appropriate variation of propeller pitch. Adjustment of this engine speed control normally requires a servo motor located on the engine itself and for accurate control without hunting it is desirable to feed back to a control unit in the aircraft a signal of servo motor positional movement. The most desirable means of indicating servo motor movement is electrical, but it has the disadvantage that the kind of instrument normally used, for example, a synchro, involves brush contacts which under heavy engine vibration conditions tend to be unreliable. The present invention sets out to provide an aircraft propeller engine speed control in which the means for giving a signal of positional movement of the engine mounted speed control is electrical, but avoids the use of brush contacts.

In accordance with the present invention an aircraft propeller engine speed control includes a servo motor mounted on the engine to effect actual speed control on the engine or propeller in response to signals derived from a remote control for the servo motor, and an electrical device mounted on the engine and connected to the servo motor and feeding back through electrical connections to the remote control to modify the signals derived therefrom a multi-phase in space signal in which the relative amplitudes are indicative of the position and the space frequency is proportional to rate of movement of the servo motor, the electrical device comprising one stator connected to an energising supply of single phase alternating current, a second stator having multi-phase windings from which the multi-phase in space output is obtained, and a multi-phase rotor co-operating with each stator, these rotors being electrically interconnected and mounted on the same shaft for movement by the servo motor. Preferably the servo motor is a brushless electrical alternating current motor and the whole speed control system is powered by the aircraft alternating current supply.

For the purpose of this specification it is to be understood that the multi-phase in space principle comprises the splitting up of a single phase alternating energising electric supply into a plurality of phases in space, each phase of which comprises alternating current at the energising frequency which is amplitude modulated at the space frequency, the angular spacing of these space phases being, for example, 90° in a two-phase in space system or 120° in a three-phase in space system. When applied for position indicating the energising current is amplitude modulated into the required number of space phases by a transmitting synchro, the space frequency, i.e., the frequency of amplitude modulation of each phase being proportional to the rate of movement of the position to be indicated. Where the position to be indicated is stationary the space frequency is zero and the relative amplitude of the phases in space then becomes an indication of the position. Essentially the space frequency must be much lower than the energising frequency. The conversion of the multi-phase in space current at a receiver into an indication of a position is usually effected by means of a receiving synchro which is fed with the multi-phase in space current and also current at the energising frequency.

In order that the present invention may be clearly understood one embodiment thereof will be described with reference to the accompanying drawings, in which.

Figure 1:
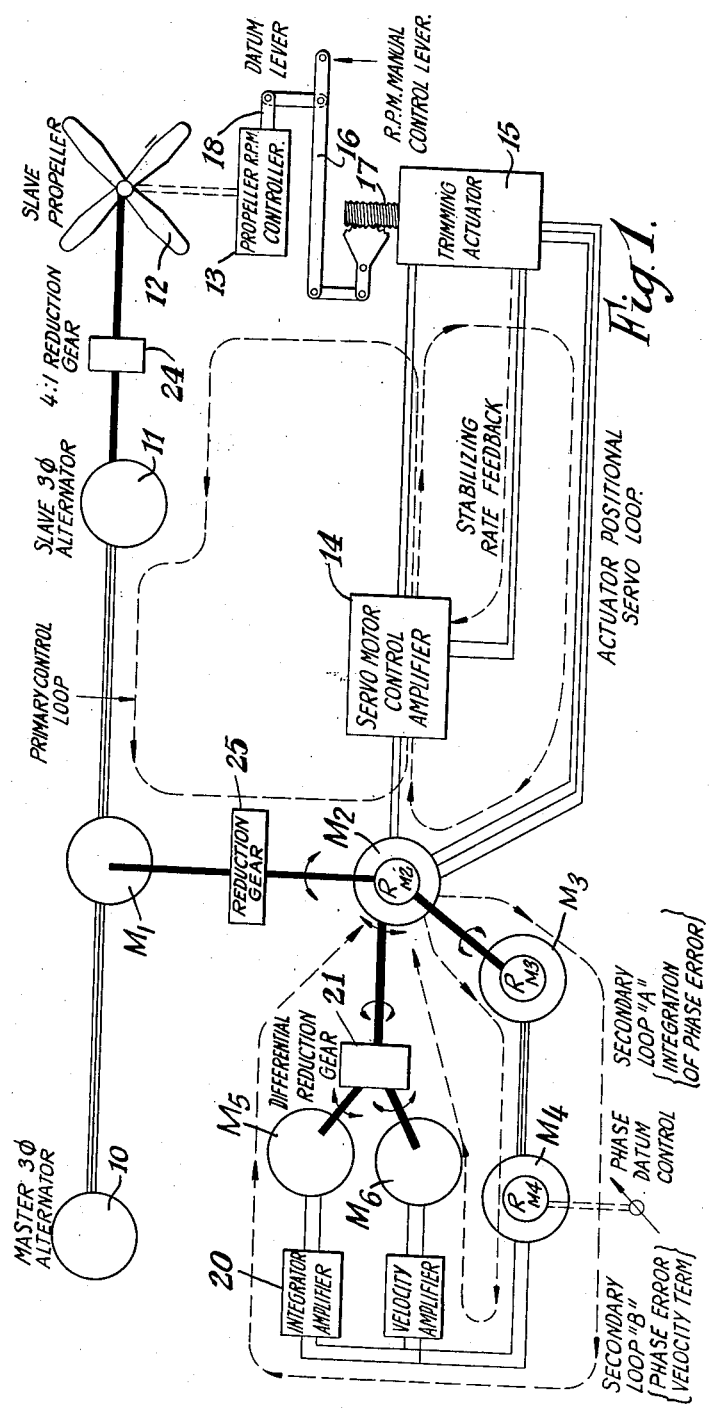
FIGURE 1 is a schematic diagram of the system.

Referring to FIGURE 1, there is shown a master three-phase alternator 10 which may be driven by an aircraft engine or alternatively independently driven, a slave three-phase alternator 11 driven by a slave engine whose propeller is indicated at 12 and a speed governor 13 for the slave engine. The two three-phase alternators may be the tacho generators normally used on engines for speed indication. The alternator 11 is driven through a 4:1 reduction gear 24 so as to rotate through 360° during 90° rotation of the four-bladed propeller. Thus for each revolution of the alternator, a different blade is in a datum position. The three-phase connections from the two alternators 10 and 11 are connected to a comparator M1 which comprises a pair of fields having three-phase windings in which a soft iron rotor is mounted, the two fields being connected for opposite rotation, such that the soft iron rotor rotates at half the difference speed of the fields. The rotor of comparator M1 is connected to drive through a reduction gear 25 the rotor of a synchro M2 which has a rotor having a single phase winding and a stator having a three-phase winding. The reduction gear determines the amount of correction for a given speed difference. The stator is only referred to as such for convenience and is actually mounted for rotation. The rotor of comparator M1 also drives through the reduction gear a second synchro M3 having a single phase rotor and a three-phase fixed stator. The rotor of the synchro M2 develops an error signal, in a manner to be presently described, which is fed into a servo motor control amplifier 14 and whose output is connected to the trimming actuator 15 mounted on the engine. The output of the trimming actuator operates a floating lever 16 through a worm drive 17. The floating lever is connected to the speed control lever 18 of the engine speed control 13, and a third point on the floating lever is connected to a manual speed control lever. The speed control 13 is of the well known hydraulic kind which incorporates engine driven fly weights which operate an hydraulic valve to adjust the pitch of propeller 12, spring loading to bias the fly weights being controlled by the lever 18.

Figure 2:
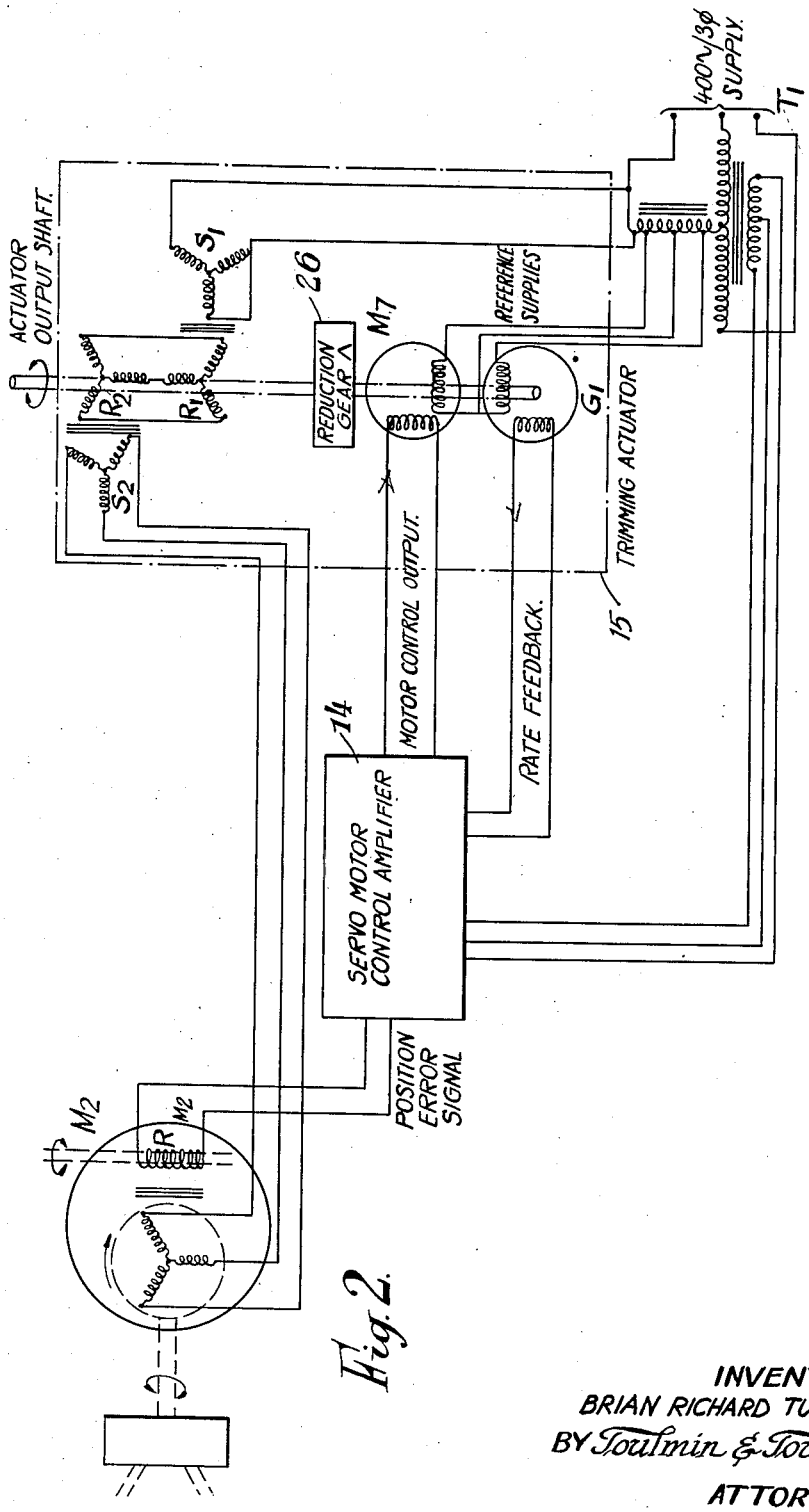
FIGURE 2 is a schematic diagram of the servo motor mounted on the engine, means for indicating servo motor movement and the connections to parts of the speed control mounted in the aircraft.
Figure 3:
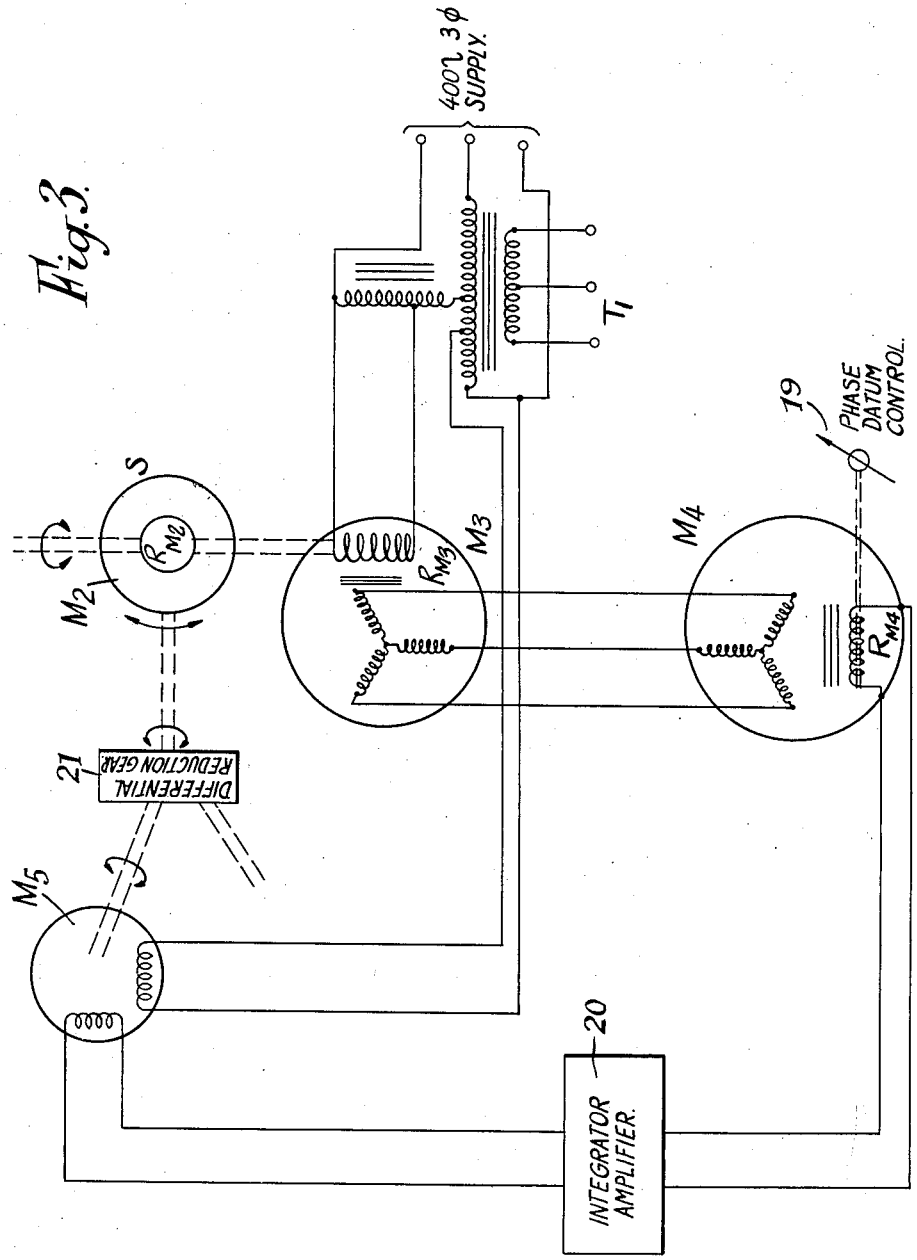
FIGURE 3 is a schematic diagram of a portion of the control mounted in the aircraft.
Figure 4:
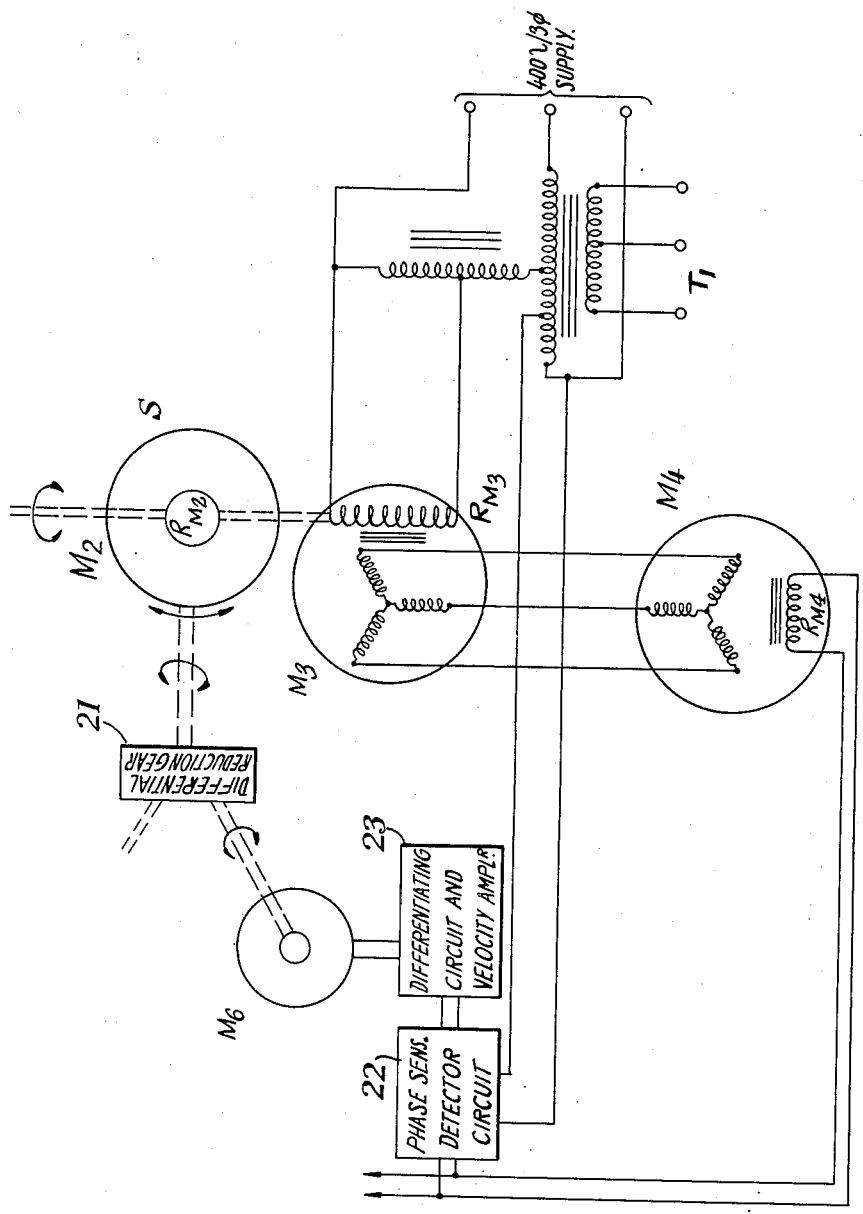
FIGURE 4 is a schematic diagram of a further part of the control mounted in the aircraft.

In order to describe the system in more detail reference is made to FIGURES 2, 3, and 4.

In FIGURE 2 details of the engine mounted trimming actuator are shown. This actuator includes a two-phase motor M7, one phase of which is permanently fed from the aircraft's alternating supply through the medium of a Scott connected transformer, the other phase being energised by a motor control output from amplifier 14. This motor drives the worm 17 through a reduction gear 26 so that a high speed motor can be used to produce a low speed drive. This motor M7, in fact, forms the servo motor which acts on the engine speed control. A rate generator G1 is connected to be driven by the servo motor M7 and is energised from the Scott connected transformer, the output being fed back into the amplifier 14 as a stabilising control. On the worm 17 of the actuator is mounted an electrical means for indicating servo motor position and movement. This means comprises a pair of three-phase stators S1 and S2 and a pair of rotors R1 and R2 co-operating one with each stator and both driven by the output shaft connected to worm 17. The two rotors R1 and R2 are electrically interconnected, the actual method of connection being important. The stator S1 is connected in a single-phase manner and energised from the Scott connected transformer and when in use a three-phase in space signal is generated in rotor R1 in accordance with the rotation of the servo motor. The interconnection of the rotors R1 and R2 must be such that the rotating field produced in R2 is in an opposite sense to that which acts on R1, whereby there is induced in the stator S2 a three-phase in space signal whose space frequency is double the rotational speed of the output shaft of the drive worm 17. Servo motor M7, rate generator G1 and the position indicating means are mounted as a unit on the engine which drives the propeller 12 and are necessarily subject to engine vibrations. Since there are no brushes involved in any of the devices in the actuator it will be seen that there can be no possibility of poor or intermittent contacts which might arise if brush contacts were employed. The amplifier 14 is, of course, mounted on the aircraft away from the engine, together with the other portions of this control system which are shown in FIGURES 3 and 4. The output from the stator S2 in the trimming actuator is connected back to the stator of synchro M2 and it will thus be seen that a positional servo loop is established which includes the amplifier 14, servo motor M7, servo motor position indicating means S1, R1, R2, S2, synchro M2, back to amplifier 14.

When in use the single phase current in the stator S1 can be represented as a flux vector having a predetermined angular position. With no output from the amplifier 14, the actuator output shaft is stationary and the single phase current in the stator S1 induces currents at the energising frequency in each of the three windings of the rotor R1. As the windings are phase displaced, the amplitude of the current in each of the windings is dependent on its angular position relative to the stator S1. These currents are also developed in the windings of the rotor R2 and thus there are induced similar currents in the windings of the stator S2. The output from the stator S2 is connected to the stator of the synchro M2. The currents in the windings of the stator of the synchro M2 can be represented as a vector having an angular position which remains stationary whilst the worm 17 is stationary. Thus whilst the rotor $Rm_2$ is in a stationary angular position, effectively normal to the flux vector in the stator, no error signal appears to be put into the amplifier 14.

If, however, the rotor $Rm_2$ is moved, an error signal is derived indicative of the positional displacement of the rotor $Rm_2$ from the flux vector in the stator. This results in a movement of the worm 17 and of the rotors R1 and R2. As the rotors R1 and R2 revolve relative to the stator S1, the amplitude of the current at energising frequency induced in each of the windings of the rotor R1 is varied cyclically at a frequency dependent upon the rate of movement of the worm 17. Thus a three-phase in space signal is generated in the rotor R1, the amplitude of the current at energising frequency being indicative of the position of the servo motor and the frequency of modulation of this current or space frequency being indicative of the speed of rotation of the servo motor. The interconnection of the rotors R1 and R2 must be such that the rotating field produced in R2 is in an opposite sense to that which acts on R1, whereby there is induced in the stator S2 a three-phase in space signal whose space frequency is double the rotational speed of the worm 17. The output from the stator S2 is fed to the stator of the synchro M2 and the current vector therein rotates at the space frequency which is double the rotational speed of the worm 17. This varies the error signal produced by the rotor $Rm_2$ so that the speed error in the engine of the propeller 12 is corrected without overshoot. The datum in the synchro M2, being provided by the three-phase current in the stator, follows up the rotor $Rm_2$ in accordance with servo motor position.

An actuator positional servo loop is established which includes the amplier 14, the servo motor M7, the servo motor position indicating means S1, R1, R2, S2, and synchro M2. Servo motor M7, rate generator G1 and the position indicating means are mounted as a unit on the engine which drives the propeller 12 and are necessarily subject to engine vibrations. Since there are no brushes involved in any of the devices in the actuator it will be seen that there can be no possibility of poor or intermittent contacts which might arise if brush contacts were employed. The control synchro M2 and amplifier 14 are, of course, mounted on the aircraft remote from the engine, together with the other portions of this control system which are shown in FIGURES 3 and 4.

Reference is now made to FIGURE 3 which discloses the portion of the system whose purpose is to integrate phase error between alternators 10 and 11 and eventually to cause it to be reduced to a small amount.

As previously mentioned the rotor $Rm_2$ of synchro M2 is connected to the rotor $Rm_3$ of synchro M3. The three-phase stator of synchro M3 is connected to the fixed three-phase stator of further synchro M4 whose single-phase rotor is connected to an external manual phase datum control 19 which adjusts the datum point for integration of the phase errors. The output from the rotor $Rm_4$ of synchro M4 is fed to an amplifier 20 whose output is fed to the control phase of a two-phase motor M5. The other phase of this servo motor is energised from the Scott connected transformer. The mechanical output from the motor M5 is connected through a differential gear 21 to drive the "stator" of synchro M2. This system forms a secondary loop for integration of phase error. When in operation, phase datum error is represented by an angular departure of the rotor of comparator M1 from that position which represents the desired phase relationship between propellers. This results in a proportionate departure of the rotor $Rm_3$ of synchro M3 from the "null" position, of the synchro chain M3 and M4. The resulting phase error signal appearing at the rotor $Rm_4$ of M4 is fed to the amplifier 20 which then energises motor M5 to slowly rotate the stator of synchro M2. Such rotation will generate an error signal in the rotor $Rm_2$ of synchro M2 which is fed to the amplifier 14 and causes slow alteration of the trimming actuator resulting in a departure of the slave propeller from the speed synchronising conditions. Corrective action of the main servo loop maintaining speed synchronism causes an identical and almost simultaneous rotation of M2 rotor $Rm_2$ and therefore M3 rotor $Rm_3$, since the two are mechanically coupled. This action will continue until M3 rotor $Rm_3$ reaches is "null" position when further datum correction will cease.

Reference is now made to FIGURE 4 which is concerned with a further secondary loop dealing with phase error velocity term. This loop includes the two synchros M3 and M4 referred to in FIGURE 3, the output from the rotor $Rm_4$ then being taken through the phase sensitive detector circuit 22 which operates by comparison with a supply from the Scott connected transformer. The output from this detector circuit 22 is differentiated by a capacitor resistance network and amplified in the unit 23. The output from unit 23 is fed to an electro magnetic transducer M6 whose output shaft then moves in accordance with the amplitude of the signal applied to its control windings and in a direction depending on the polarity of the applied signal. The rotation of the shaft of M6 may be in one direction or the other depending on whether the phase change rate between alternators 10 and 11 is positive or negative and the movement is applied through the differential gear 21 to the "stator" of synchro M2. Operation of the servo motor M6 will thus cause an error signal to develop in the rotor $Rm_2$ of synchro M2 which in turn causes a signal to be fed to amplifier 14, in such a way as to correct hunting which may occur in the primary loop.

In operation, if it is assumed that the stator of synchro M2 remains stationary, the output shaft of the trimming actuator 15 will rotate at a speed proportional to the speed of rotation of the comparator rotor, i.e. in accordance with the speed difference between the alternators 10 and 11. This rotation will, of course, be in such a direction to reduce the speed difference by varying the setting of the propeller speed control 13. When speed synchronism is established between the alternators the rotational speed of the actuator will be substantially zero unless there is a definite total phase error existing between master and slave alternators which as described with reference to FIGURE 3 will cause a continuous slow change of phase until the phase error is reduced to zero, this zero being that determined by the setting of the phase datum control 19.

It will be understood that this invention is susceptible to modification in order to adapt it to different usages and conditions, and, accordingly, it is desired to comprehend such modifications within this invention as may fall within the scope of the appended claims.

I claim:

1. In an aircraft propeller engine speed control including a servo motor to effect actual speed control on the engine in response to signals derived from a control device responsive to speed error, an electrical feedback device comprising one stator having a winding connected to an energizing supply of single phase alternating current, a second stator having a multi-phase winding from which a multi-phase in space signal is obtained, the relative amplitudes of said multiphase in space signal being indicative of the position and the space frequency of the rate of movement of the servo motor, and a rotor cooperating with each stator, the rotors having electrically interconnected multi-phase windings and being mounted on the same shaft for movement by the servo motor, the electrical feedback device feeding back the multiphase in space signal through electrical connections to the control device to modify the signals derived therefrom.

2. In an aircraft propeller engine speed control including a servo motor to effect actual speed control on the engine in response to signals derived from a control device responsive to speed error, an electrical feedback device comprising one stator having a multi-phase winding connected to an energizing supply of single phase alternating current, a second stator having a multi-phase winding from which a multi-phase in space signal is obtained, the relative amplitudes of said multi-phase in space signal being indicative of the position and the space frequency of the rate of movement of the servo motor, and a rotor co-operating with each stator, the rotors having electrically interconnected multi-phase windings and being mounted on the same shaft for movement by the servo motor, the feedback device feeding back the multi-phase in space signal through electrical connections to the control device to modify the signals derived therefrom.

3. In an aircraft propeller engine speed control including a servo motor to effect actual speed control on the engine in response to signals derived from a control device responsive to speed error, an electrical device forming part of the control device and having a first rotor driven in accordance with speed error, a winding on said rotor in which the error signal is generated and a first stator having a multi-phase winding, and an electrical feedback device comprising a second stator having a winding connected to an energizing supply of single phase alternating current, a third stator having a multi-phase winding from which a multi-phase in space signal is obtained, the relative amplitudes of said multi-phase in space signal being indicative of the position and the space frequency of the rate of movement of the servo motor, and a rotor co-operating with each of said second and third stator, the two last mentioned rotors having electrically interconnected multi-phase windings and being mounted on the same shaft for movement by the servo motor, the feedback device feeding back said multi-phase in space signal through electrical connections to said first stator winding to modify the signals derived from said first rotor winding.

4. In an aircraft propeller engine speed control including a servo motor to effect actual speed control on the engine in response to signals derived from a control device responsive to speed error, an electrical device forming part of the control device and having a first rotor driven in accordance with speed error, a winding on said first rotor in which the error signal is generated and a first rotatable stator having a multi-phase winding, an electrical feedback device comprising a second stator having a winding connected to an energizing supply of single phase alternating current, a third stator having a multi-phase winding from which a multi-phase in space signal is obtained, the relative amplitudes of said multi-phase in space signal being indicative of the position and the space frequency of the rate of movement of the servo motor, and a rotor co-operating with each of said second and third stator, the two last mentioned rotors having electrically interconnected multi-phase windings and being mounted on the same shaft for movement by the servo motor, the feedback device feeding back the multi-phase in space signal through electrical connections to said first stator winding to modify the signals derived from said first rotor winding, a phase error signal generator having a fourth rotor driven in accordance with speed error said fourth rotor having a winding connected to an energizing supply of single phase alternating current, a fourth stator associated with said fourth generator rotor having a multi-phase winding, a fifth stator having a multi-phase winding electrically connected to said fourth stator winding, a phase error signal generating winding associated with said fifth stator, and a second servo motor arranged to be driven in response to phase error signals generated and operatively connected to rotate said first rotatable stator.

5. In an aircraft propeller engine speed control including a servo motor to effect actual speed control on the engine in response to signals derived from a control device responsive to speed error, an electrical device forming part of the control device and having a first rotor driven in accordance with speed error, a winding on said first rotor in which the error signal is generated and a rotatable first stator having a multi-phase winding, an electrical feedback device comprising a second stator having a winding connected to an energizing supply of single phase alternating current, a third stator having a multi-phase winding from which the multi-phase in space signal is obtained, the relative amplitudes of said multi-phase in space signal being indicative of the position and the space frequency of the rate of movement of the servo motor, and a rotor co-operating with each of said second and third stator, the two last mentioned rotors having electrically interconnected multi-phase windings and being mounted on the same shaft for movement by the servo motor, the feed back device feeding back the multi-phase in space signal through electrical connections to said first stator winding to modify the signals derived from said first rotor winding, a phase error signal generator having a fourth rotor driven in accordance with speed error and having a winding connected to an energizing supply of single phase alternating current, a fourth stator associated with said fourth generator rotor having a multi-phase winding, a fifth stator having a multi-phase winding electrically connected to said fourth stator winding, an adjustable phase datum rotor associated with said fifth stator and having a phase error signal generating winding and a second servo motor arranged to be driven in response to phase error signals generated and operatively connected to rotate said first rotatable stator.

6. In an aircraft propeller engine speed control, including a servo motor to effect actual speed control on the engine in response to signals derived from a control device responsive to speed error, an electrical device forming part of the control device and having a first rotor driven in accordance with speed error, a winding on said first rotor in which the error signal is generated and a first rotatable stator having a multi-phase winding, an electrical feedback device comprising a second stator having a winding connected to an energizing supply of single phase alternating current, a third stator having a multi-phase winding from which a multi-phase in space signal is obtained, the relative amplitudes of said multi-phase in space signal being indicative of the position and the space frequency of the rate of movement of the servo motor, and a rotor co-operating with each of said second and third stator, the two last mentioned rotors having electrically interconnected multi-phase windings and being mounted on the same shaft for movement by the servo motor, the feedback device feeding back the multi-phase in space signal through electrical connections to said first stator winding to modify the signals derived from said first rotor winding, a phase error signal generator having a fourth rotor driven in accordance with speed error and having a winding connected to an energizing supply of single phase alternating current, a fourth stator associated with said fourth generator rotor having a multi-phase winding, a fifth stator having a multi-phase winding electrically connected to said fourth stator winding, a phase error signal generating winding associated with said fifth stator, a second servo motor arranged to be driven in response to phase error signals generated and operatively connected to rotate said first rotatable stator, and a third servo motor arranged to be driven in response to the rate of change of phase error signals generated and operatively connected to modify the rotation of said first rotatable stator.

References Cited in the file of this patent

UNITED STATES PATENTS

| | | |
|---|---|---|
| 2,824,422 | Peterson | Feb. 25, 1958 |
| 2,887,621 | Wilde | May 19, 1959 |
| 2,919,384 | Guarino | Dec. 29, 1959 |